United States Patent Office 3,291,644
Patented Dec. 13, 1966

3,291,644
DEFERRED ACTION TYPE ELECTRIC BATTERY HAVING ELECTROLYTE GUIDING MEANS
Robin Gray and Harold C. Jones, Swinton, near Manchester, England, assignors to Chloride Batteries Limited, Manchester, England, a company of Great Britain
Filed June 14, 1963, Ser. No. 287,942
Claims priority, application Great Britain, June 15, 1962, 23,062/62
6 Claims. (Cl. 136—90)

This invention relates to electric cells comprising a casing containing an element consisting of electrodes and separators, of the type that is activated by introduction of liquid to the element shortly before use.

The invention is characterized in that the liquid is introduced to the element from the bottom so as to rise upwards through it.

In one form of the invention the liquid is introduced through a filling opening in the top of the casing and guiding means are provided for guiding it so as to flow clear of the element to the region of the bottom and thence rise upwards through the element. The filling opening may be provided during manufacture, or alternatively in some cases a filling opening may be made just prior to filling. In another form of the invention the liquid is contained in a compartment located within the cell casing, and means are provided to open this compartment to the interior of the cell and guiding means are provided for guiding the liquid so as to flow clear of the element to the region of the bottom and thence rise upwards through the element. In this case a filling opening may be made just prior to filling.

The guiding means may comprise an inverted inner container enclosing the element but open at the bottom and having a vent at the top for the escape of air.

The inverted inner container may be of rigid construction or alternatively it may be in the nature of a bag formed of a thin film of flexible material. Instead of employing a pre-formed bag the inner container may be formed by wrapping a sheet of film about the element so as to guide the entering liquid to flow clear of the element to the region of the bottom.

The inverted inner container or other guiding means may be formed of a material that will resist attack by the electrolyte so as to remain in position throughout the life of the cell. Alternatively it may be formed of a material that will be destroyed or dissolved by the electrolyte after serving its purpose.

The cell may be employed in combination with automatic activating means for automatically discharging liquid into contact with the element when the cell is required for use.

Figure 1:
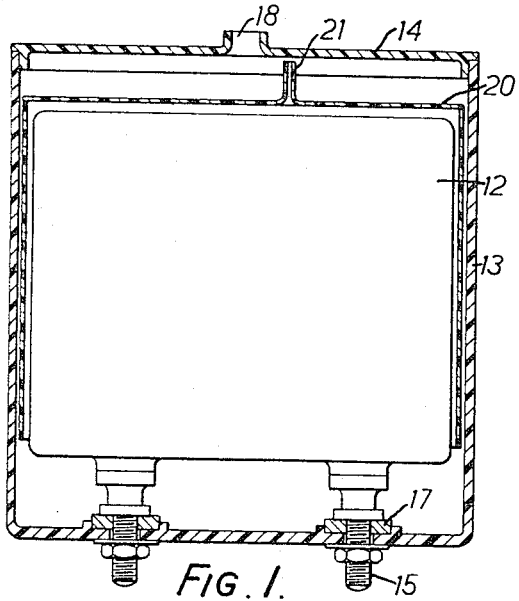
Figure 2:
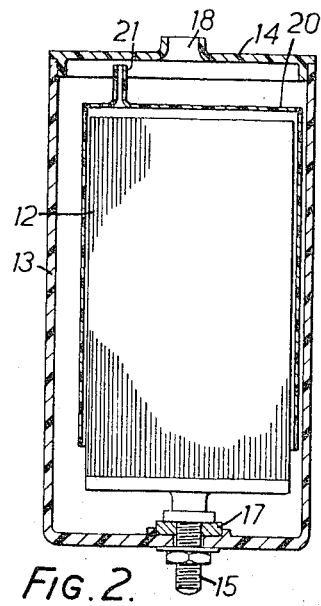
Figure 3:
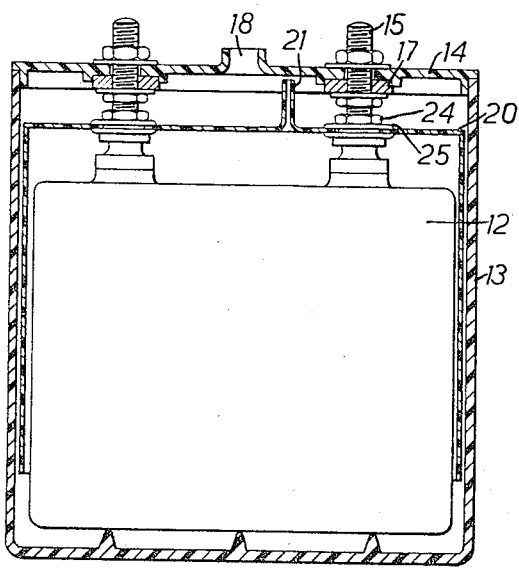
Figure 4:
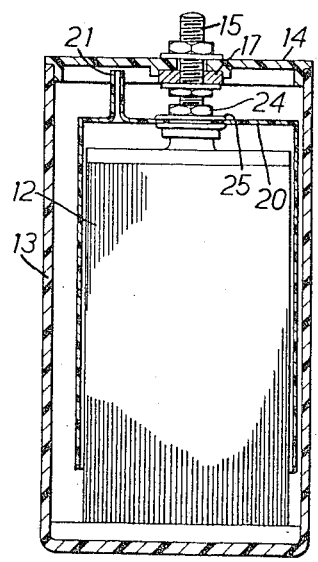

The invention may be performed in various ways, but two specific embodiments will be described by way of example with reference to the accompanying diagrammatic drawings in which:

FIGURES 1 and 2 are respectively sectional side and end elevations of one form of cell, and FIGURES 3 and 4 are respectively side and end elevations of another form of cell.

The invention is broadly applicable to any type of electric cell that is activated by introduction of liquid shortly before use, but is particularly valuable in cells employing bibulous separators, especially where the separators are thin and the plates extensive and close together.

Moreover the requirement that a cell should remain inactive for a long period and then be activated by the addition of liquid and rapidly ready for use is likely to arise mainly in connection with primary cells or at least in connection with cells which though possibly theoretically capable of being re-charged are in fact never intended to be re-charged or of which the detailed design is such that they would not be suitable for re-charging. Thus one particular application of the invention is to a cell of the silver oxide/zinc type.

FIGURES 1 and 2 show one such cell comprising an element 12 consisting of silver oxide and zinc plates interleaved and separated by separators of suitable material such as absorbent paper or similar thin felt-like sheet material.

The element 12 is contained in a casing 13, having a cover 14, and has terminal posts 15 passing through openings in the bottom of the casing. The openings in the bottom are sealed by suitable washers or grommets 17.

The top of the casing has in it a filling opening 18 which communicates with any suitable means for automatically supplying liquid to it, to activate the cell shortly before it is required for use.

In accordance with the present invention the element is enclosed within a thin walled inner casing 20 which is open at the bottom but is closed at the top with the exception of an upstanding vent pipe 21, and which fits closely round the element.

Accordingly when liquid flows in through the filling opening it will run off the top of the inner container and down its sides into the bottom of the casing without being able to enter the element. At the bottom it will flow under the element and gradually rise through it without entrapping air as is liable to be the case if it is poured in through the top of the element.

The rate at which the liquid can rise through the element may be controlled by restricting the rate at which the liquid is supplied, or by restricting the space between the inner and outer containers, or by restricting the vent 21, or by a combination of these measures. In this way the element can be rapidly and completely flooded with liquid, giving the air the opportunity to escape without leaving entrapped bubbles, even when the plates are close together and separated by thin separators of bibulous material.

If necessary, as shown in FIGURE 2, the element may be situated eccentrically within the casing so as to leave an additional space down one side for the flow of the liquid.

The inner casing may be formed of any suitable material. In the construction shown in FIGURES 1 and 2 it is of rigid construction formed of a thin synthetic plastic material such as polystyrene, polyvinylchloride or polyethylene, which is resistant to the electrolyte and is intended to remain in position throughout the working life of the cell.

Alternatively the inner container may be in the form of a flexible bag or envelope, for example of suitable polyethylene or polyvinylchloride, which is fitted over the element and again is provided with a suitable vent to allow the air to escape whilst not allowing the liquid to pass into the interior of the bag without first flowing down the sides into the bottom of the cell. Again instead of employing a prefabricated flexible bag the element may be wrapped with a suitable flexible plastic sheet so as to cover its sides and top with the exception of a venting opening.

In a further alternative it is possible to employ a material such as polyvinyl alcohol, which has sufficient resistance to attack by or solution in the electrolyte to survive the process of filling the cell, but thereafter will be destroyed or dissolved by the electrolyte so that once it has served its purpose it ceases to exist. Such destruction would be accelerated in a cell designed to run hot.

The construction shown in FIGURES 3 and 4 is precisely analogous to that of FIGURES 1 and 2 except that the terminal posts extend through the top of the casing. The arrangement of the inner casing is similar to that of FIGURES 1 and 2 except that the top of it has a pair of holes for the passage of the terminal posts and the latter are provided with additional nuts 24 and sealing washers or gaskets 25 where they pass through these holes.

It will be appreciated that the invention is not restricted to the embodiments specifically described. Thus it is not essential that an inner container should be employed to guide the liquid clear of the element since ducts or troughs may be employed for this purpose. Indeed the invention does not exclude the use of a pipe leading from the filling opening to the bottom of the casing, although this may tend to result in air bubbles being carried down into the bottom of the casing and hence be less effective than an inner container or open trough. Again the liquid may enter the casing through the bottom, for example through a pipe connection which is connected by a flexible tube to a reservoir which can be raised to introduce the liquid to the cell. In another embodiment of the invention the liquid is contained in a compartment located within the cell casing 14, and means such as for example a spring loaded plunger are provided to open this compartment to the interior of the cell. As in the other embodiment guiding means are also provided for guiding the liquid so as to flow clear of the element to the region of the bottom and thence to rise upwards through the element.

In some cases it will be appreciated that the liquid introduced into the cell, in order to activate it, is not the complete electrolyte but may merely be a solvent such as water which dissolves solid materials already in the cell in order to form the complete electrolyte.

What we claim as our invention and desire to secure by Letters Patent is:

1. An electric cell of the type that is activated by introduction of liquid shortly before use comprising a casing, an element consisting of electrodes and separators positioned within said casing, said element being open at the bottom, a filling opening formed in the top of said casing through which said liquid is introduced to the element to activate the cell shortly before use, and guiding means for directing said liquid substantially as a sheet outwardly and downwardly substantially along the top and sides of said casing, respectively, said guiding means being an inverted container wholly within said casing and substantially enclosing the element along the top and sides but open at the bottom, a vent formed at the top of said container remote from said filling opening for the escape of air, whereby said liquid when introduced through said filling opening flows clear of said element to the region of the bottom of said casing and thence upward through the element to prevent formation of air bubbles and to allow air in said element to escape through said vent.

2. A cell as claimed in claim 1 in which the inverted inner container is of rigid construction.

3. A cell as claimed in claim 1 in which the inverted inner container is in the form of a bag formed of flexible film.

4. A cell as claimed in claim 1 in which the inverted inner container is an overlapping sheet of flexible film.

5. A cell as claimed in claim 1 in which the inverted inner container is of a material that will resist attack by the electrolyte so as to remain in position throughout the life of the cell.

6. A cell as claimed in claim 1 in which the inverted inner container is of a material having sufficient resistance to attack by said liquid during the introduction of said liquid but insufficient resistance to survive thereafter.

References Cited by the Examiner

UNITED STATES PATENTS

| | | | |
|---|---|---|---|
| 227,448 | 5/1880 | Schlumberger | 136—162 |
| 3,177,098 | 4/1965 | Amiet et al. | 136—90 |

WINSTON A. DOUGLAS, *Primary Examiner.*

B. J. OHLENDORF, *Assistant Examiner.*